US010527001B2

(12) United States Patent
Tisseau et al.

(10) Patent No.: US 10,527,001 B2
(45) Date of Patent: Jan. 7, 2020

(54) DEVICE FOR DRIVING ACTUATORS FOR A THRUST REVERSER, COMPRISING A DISENGAGEABLE MANUAL DRIVE UNIT

(71) Applicant: SAGEM DEFENSE SECURITE, Boulogne-Billancourt (FR)

(72) Inventors: Julien Tisseau, Boulogne-Billancourt (FR); Louis Chavignier, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 974 days.

(21) Appl. No.: 14/917,223

(22) PCT Filed: Sep. 9, 2014

(86) PCT No.: PCT/EP2014/069146
§ 371 (c)(1),
(2) Date: Mar. 7, 2016

(87) PCT Pub. No.: WO2015/032959
PCT Pub. Date: Mar. 12, 2015

(65) Prior Publication Data
US 2016/0230703 A1 Aug. 11, 2016

(30) Foreign Application Priority Data
Sep. 9, 2013 (FR) ...................... 13 58652

(51) Int. Cl.
*F02K 1/76* (2006.01)
*F16C 1/02* (2006.01)

(52) U.S. Cl.
CPC ................ *F02K 1/763* (2013.01); *F16C 1/02* (2013.01); *F05D 2230/72* (2013.01); *F05D 2260/902* (2013.01)

(58) Field of Classification Search
CPC . F02K 1/76; F02K 1/763; F02K 1/766; F05D 2230/72; F05D 2260/902
See application file for complete search history.

(56) References Cited

U.S. PATENT DOCUMENTS 5,035,549 A * 7/1991 Asano ..................... B25F 5/001
192/71
5,448,884 A * 9/1995 Repp ......................... F02K 1/76
239/265.31

(Continued)

FOREIGN PATENT DOCUMENTS

| EP | 2602457 | 6/2013 |
| FR | 2922059 | 4/2009 |

OTHER PUBLICATIONS

International Search Report dated Dec. 18, 2014, PCT Application No. PCT/EP2014/069146.

(Continued)

*Primary Examiner* — Richard W Ridley
*Assistant Examiner* — Brian J Mcgovern
(74) *Attorney, Agent, or Firm* — Womble Bond Dickinson (US) LLP

(57) ABSTRACT

The invention relates to a device (3) for driving actuators (7-10) for a thrust reverser, comprising a motorised drive unit (15) comprising a motor (22), a drive shaft (14) suitable for connecting to a flexible shaft (4, 5) for driving actuators (7-10), the drive shaft (14) being rotated by the motor (22) about a rotational axis (X), a manual drive unit (17) comprising a drive wheel (32) mounted such that it rotates about the rotational axis (X), and a clutch (18) comprising a clutch part (40) which is secured in rotation with the wheel (32) and mobile in translation in relation to the wheel (32), between an engaged position wherein the clutch part is connected to the drive shaft (14) in such a way as to secure the drive shaft (14) and the wheel (32) in rotation, and a disengaged (Continued)

Figure 1:
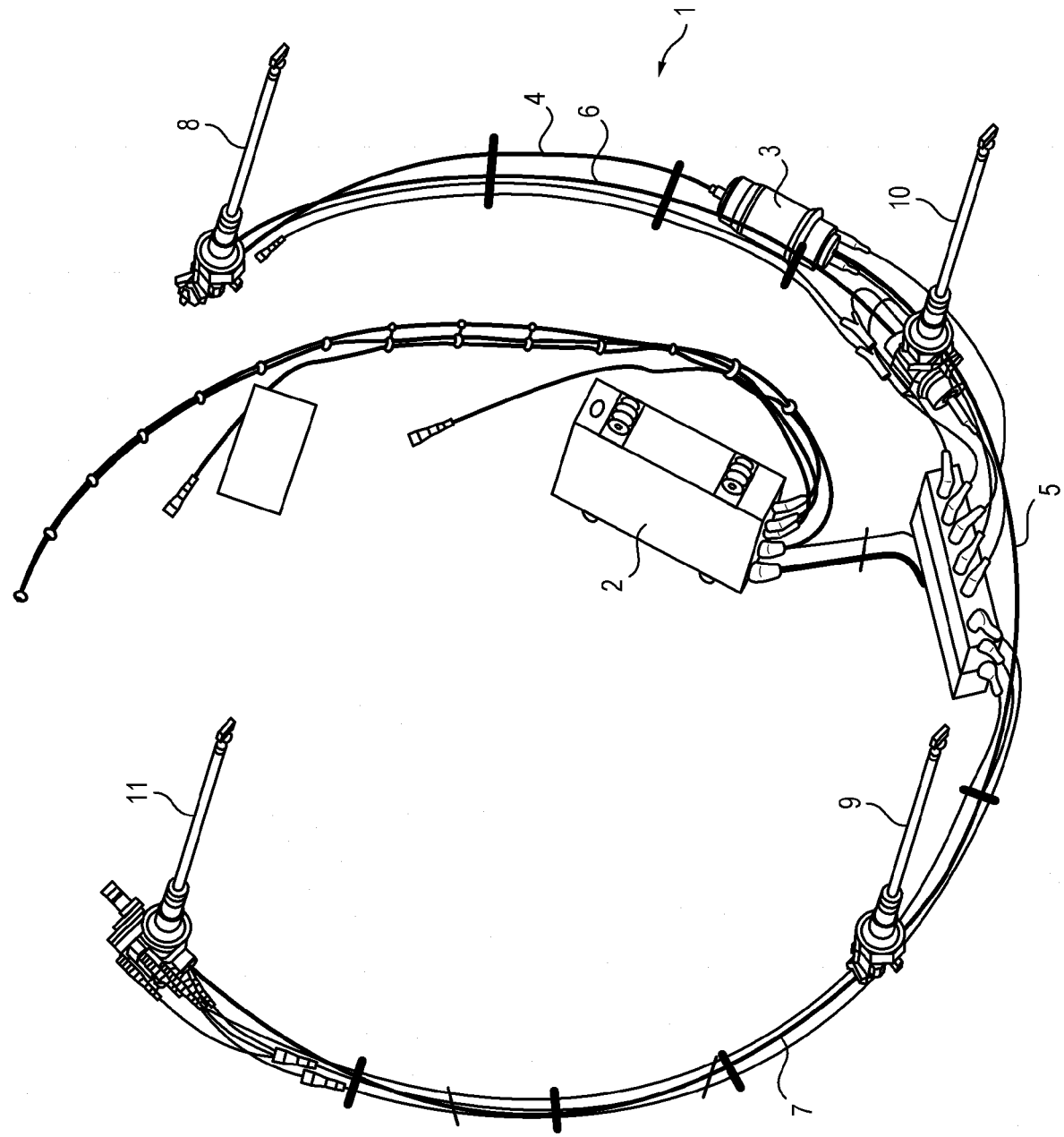

position wherein the clutch part (40) is not connected to the drive shaft (14) so as to allow an independent rotation of the drive shaft (14) and the wheel (32).

12 Claims, 8 Drawing Sheets

(56) References Cited

U.S. PATENT DOCUMENTS

| | | | | |
|---|---|---|---|---|
| 6,786,315 | B1* | 9/2004 | Christensen | F02K 1/763 |
| | | | | 188/181 T |
| 9,593,643 | B2* | 3/2017 | Tisseau | F02K 1/763 |
| 2006/0042229 | A1 | 3/2006 | Hanlon et al. | |
| 2011/0048028 | A1* | 3/2011 | Bader | F02K 1/763 |
| | | | | 60/793 |
| 2016/0308422 | A1* | 10/2016 | Viennot | H02K 5/225 |

OTHER PUBLICATIONS

French Search Report dated Jul. 2, 2014, French Application No. 20130058652.

* cited by examiner

DEVICE FOR DRIVING ACTUATORS FOR A THRUST REVERSER, COMPRISING A DISENGAGEABLE MANUAL DRIVE UNIT

FIELD OF THE INVENTION

The invention relates to a device for driving actuators for a thrust reverser, comprising a disengageable manual drive unit.

PRIOR ART

Propulsive units or PPS (Power Plant System) for aircraft generally comprise a nacelle and a jet engine fixed to a mast of a wing or to a fuselage of the aircraft. In the case of a bypass jet engine with high dilution rate (turbofan), the jet engine includes a gas generator (high-pressure body or CoHP), a low-pressure body (or CoBP), a fan and nozzles. The fan accelerates secondary airflow circulating in an air stream of the fan to generate the thrust necessary for propulsion of the aircraft.

Propulsive units of aircrafts generally comprise a thrust reverse system or TR which reverses the thrust in the landing phases to improve the braking capacity of the aircraft. Such a system comprises a set of movable cowls for temporarily obstructing the air stream and deflecting the secondary airflow to the exterior and towards the front of the nacelle, accordingly generating counterthrust which adds to wheel braking.

Each movable cowl is actuated by a set of associated actuators.

The actuators are driven by a power drive unit (PDU) comprising an electric motor connected to the actuators by means of a set of flexible shafts. The flexible shafts ensure both power transmission from the electric motor to the actuators and mechanical synchronisation of the movement of actuators.

Also, the power drive unit generally comprises a brake associated with the motor for locking the motor shaft when the motor is not activated.

When the system is in maintenance phase, it can be necessary to deploy or retract the actuators, while the motor is not fed. To this effect, the thrust reverse system further comprises a manual drive unit or MDU coupled to one of the actuators. The manual drive unit comprises an interface for receiving a tool (such as a screwdriver for example) allowing an operator to rotatably drive an input shaft of the actuator, and cause deployment or retraction of the set of actuators by means of the flexible shafts.

Actuating the manual drive unit requires prior loosening of the brake associated with the motor to allow rotation of the motor shaft.

Also, when the system is not in maintenance phase, the manual drive unit is driven in movement at the same time as the actuators, which can contribute to heightening the inertia of the thrust reverse system.

SUMMARY OF THE INVENTION

An aim of the invention is to propose a device for driving actuators for thrust reversers allowing to facilitate maintenance operations of the thrust reverse system and limit the inertia of the system.

This aim is attained within the scope of the present invention by means of a device for driving actuators for thrust reverser comprising:

a power drive unit comprising a motor, a motor shaft adapted to be connected to a flexible drive shaft of the actuators, the motor shaft being suitable to be rotatably driven by the motor according to an axis of rotation, a manual drive unit comprising a drive wheel rotatably mounted according to the axis of rotation, and a clutch comprising a clutch part rotationally fixed to the wheel and movable in translation relative to the wheel between a disengaged position wherein the clutch part is engaged with the motor shaft so as to connect in a rotationally fixed manner the motor shaft and the wheel, and a disengaged position wherein the clutch part is not engaged with the motor shaft so as to allow independent rotation of the motor shaft and of the wheel.

By way of the clutch, the clutch part is disconnected from the motor shaft when the manual drive unit is not being used.

So, once it is disengaged, the manual drive unit does not increase the inertia of the thrust reverse system.

The device can also have the following characteristics:

the clutch part is movable in translation according to an axis parallel to the axis of rotation, the wheel has inner splines and the clutch part has outer splines interleaved between the inner splines of the wheel to guide the clutch part in translation relative to the wheel, the clutch part has inner splines suitable for engaging with outer splines of the motor shaft when the clutch part is in the engaged position, the manual drive unit comprises a rotatably movable input shaft, the input shaft being suitable for being temporarily connected to a screwing and unscrewing tool to rotatably drive the drive wheel, the manual drive unit comprises an input wheel rotationally fixed to the input shaft, the drive wheel meshing with the input wheel to convert rotation movement of the input shaft into rotation movement of the drive wheel, the input shaft of the manual drive unit has an end shaped for being connected temporarily to a screwing and unscrewing tool to rotatably drive the input shaft, the device comprises a casing and the manual drive unit comprises a lockpin fixed to the input shaft, the casing has a housing for receiving the lockpin, and the input shaft is movable in translation relative to the casing between a locked position wherein the lockpin is received in the housing so as to prevent rotation of the input shaft and an unlocked position wherein the lockpin is out of the housing so as to allow rotation of the input shaft, the manual drive unit comprises a spring arranged to urge the input shaft towards the locked position, the device comprises a casing and a control part actuatable by an operator, the control part being movable relative to the casing between a powered drive position and a manual drive position, displacement of the control part from the powered drive position towards the manual drive position causing the clutch part to move towards the engaged position so as to engage the manual drive unit with the motor shaft, the device further comprises a movable brake between a clamped configuration wherein the brake prevents rotation of the motor shaft and a loosened configuration wherein the brake allows rotation of the motor shaft, and displacement of the control part from the powered drive position towards the manual drive position also causes urging the brake towards the loosened configuration to allow a rotary drive of the motor shaft by the manual drive unit.

The invention also relates to an actuator assembly for thrust reverser, comprising:
a plurality of actuators adapted to actuate a movable cowl of the thrust reverser,
a driving device such as defined previously, and
a plurality of flexible shafts connecting the motor shaft of the driving device to the actuators to transmit rotation of the motor shaft to the actuators so as to cause deployment or retraction of the actuators.

PRESENTATION OF DRAWINGS

Figure 2:
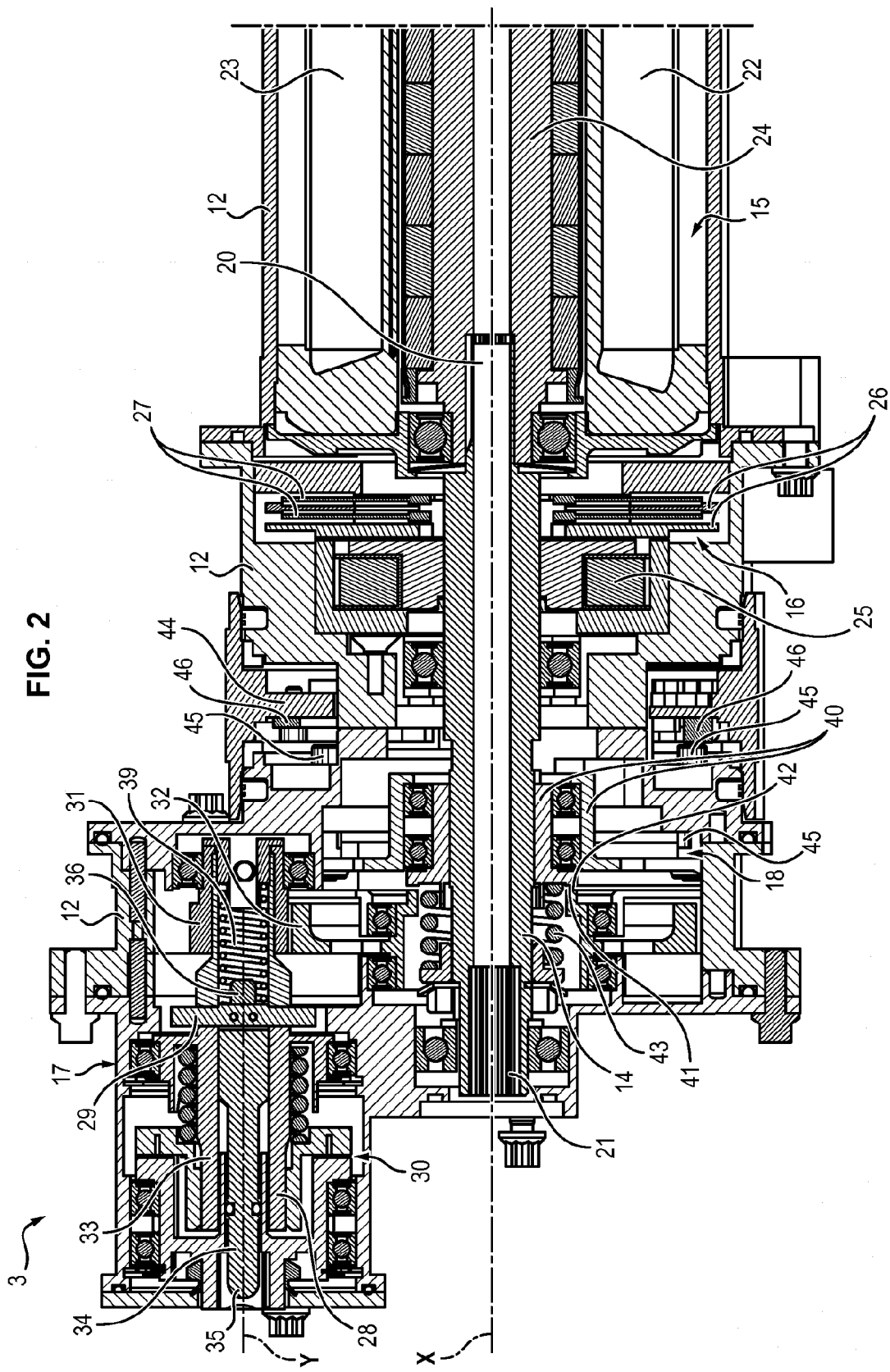
Figure 3:
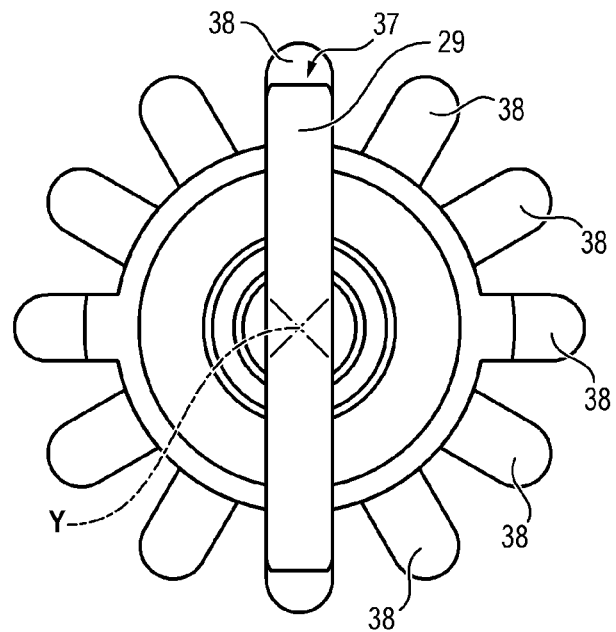
Figure 4:
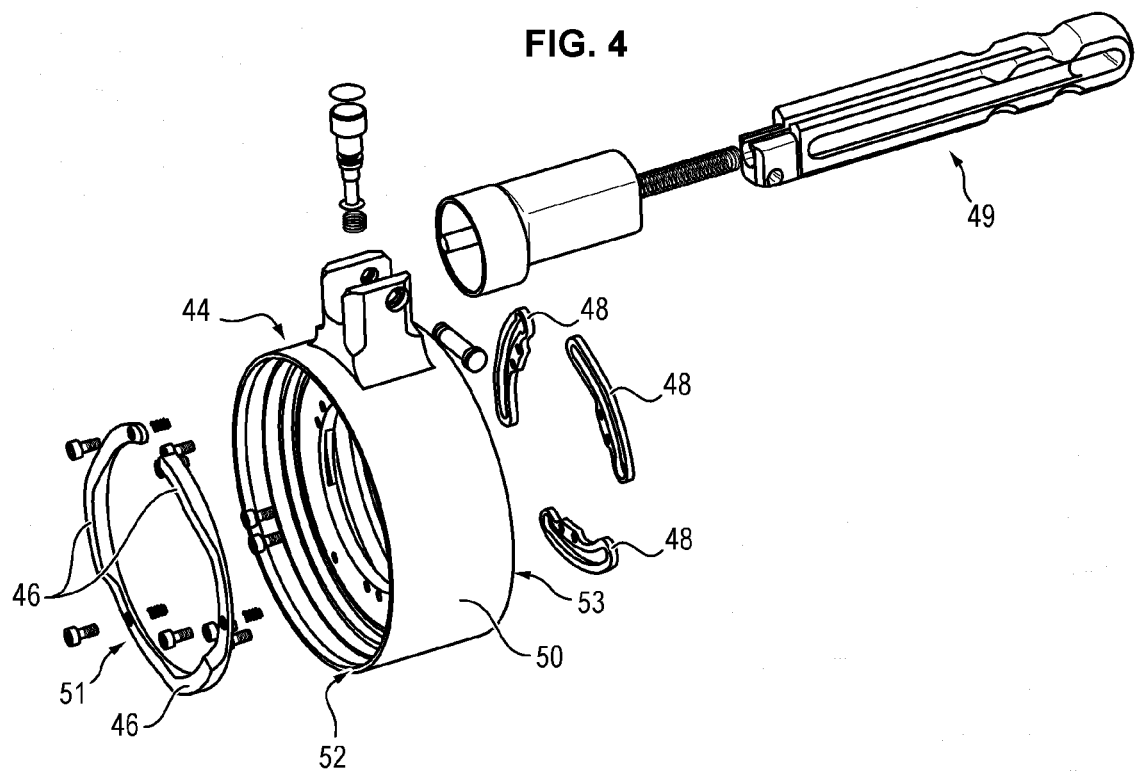
Figure 5:
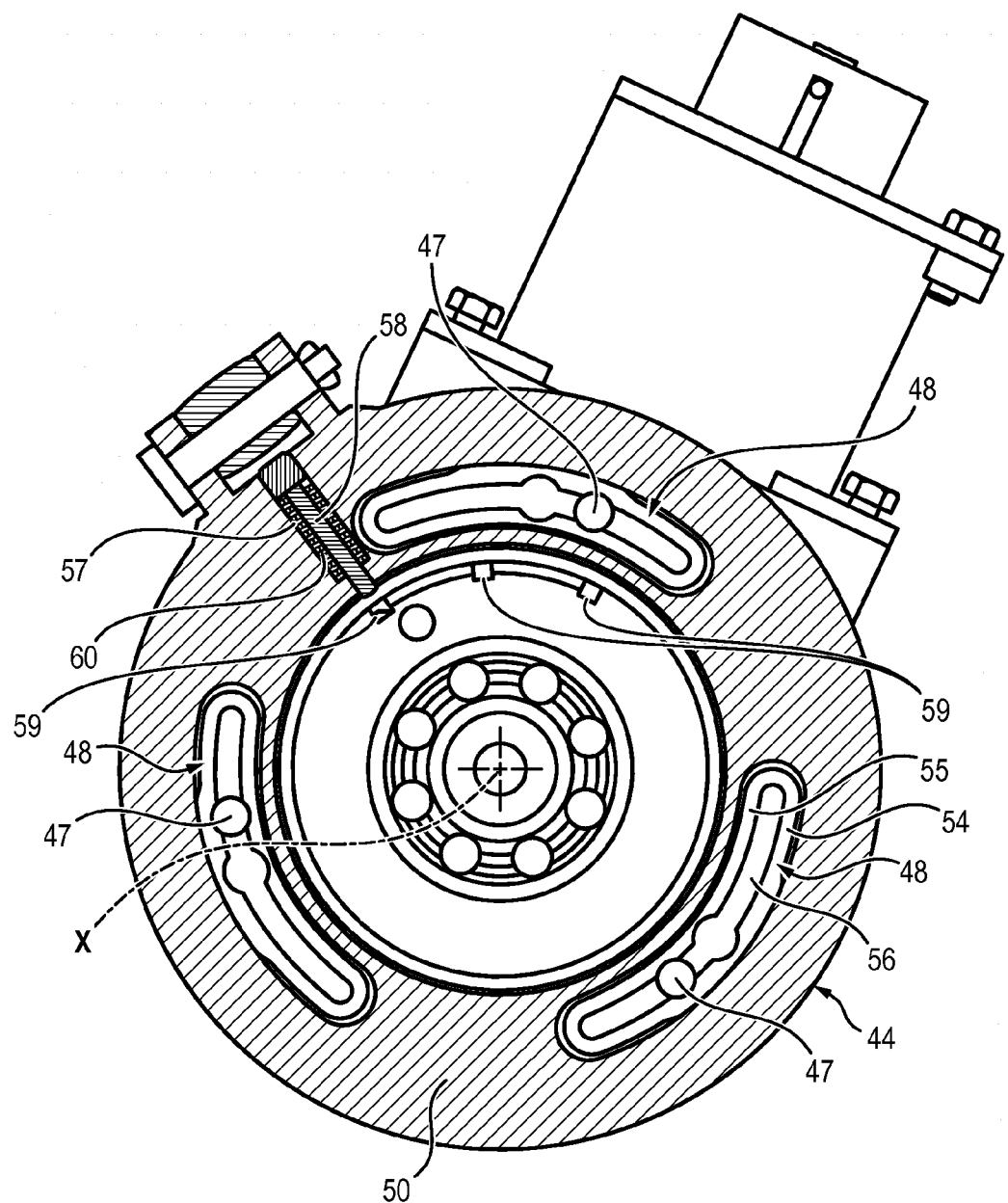
Figure 6:
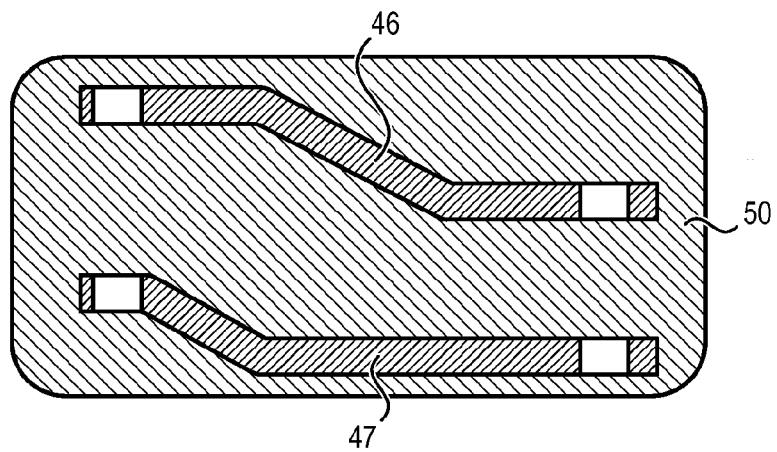
Figure 7:
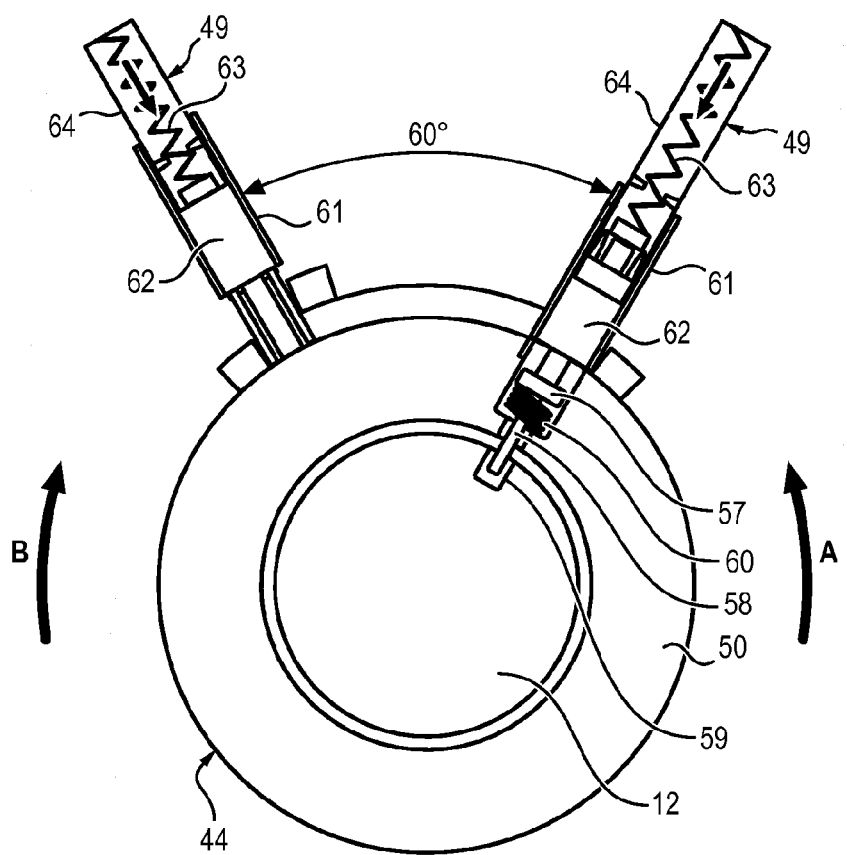
Figure 8:
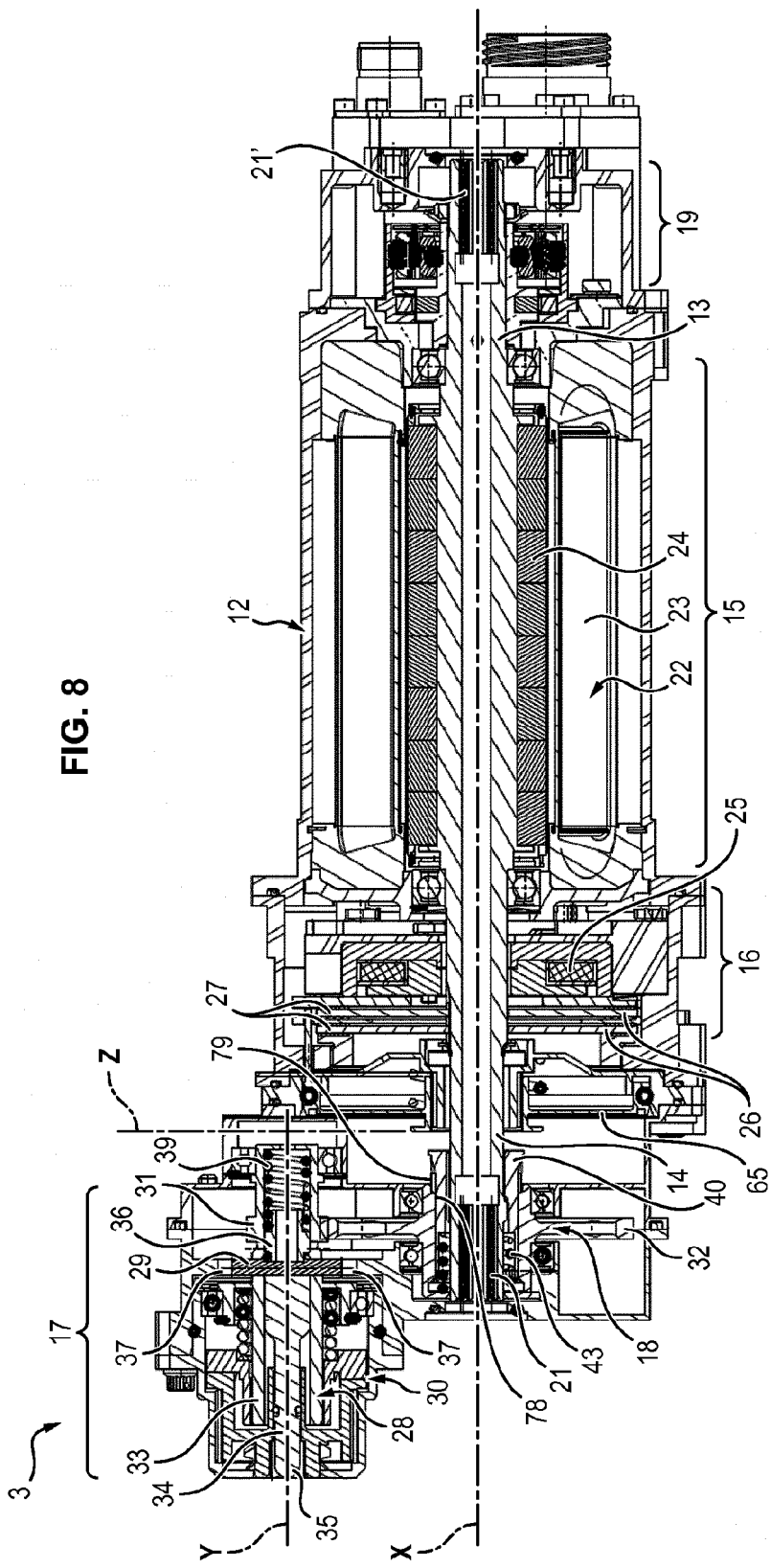
Figure 9:
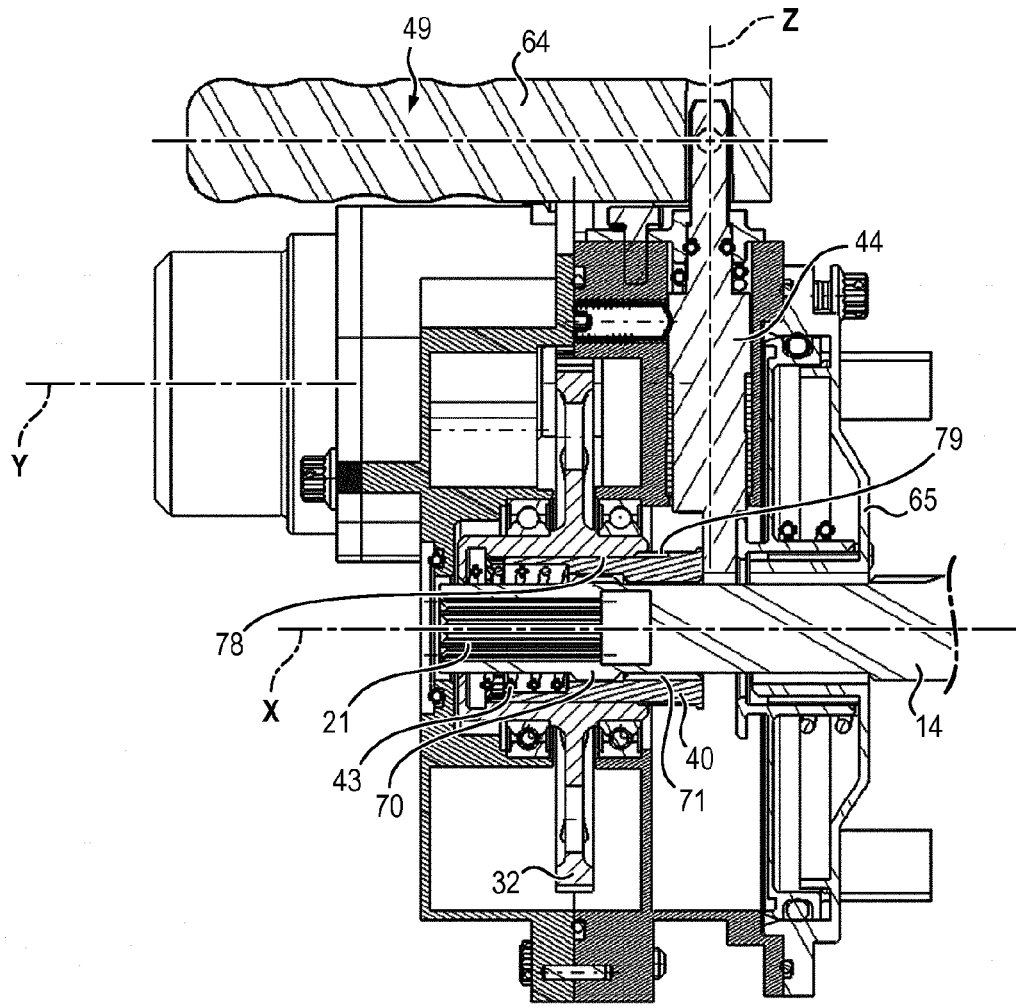
Figure 10:
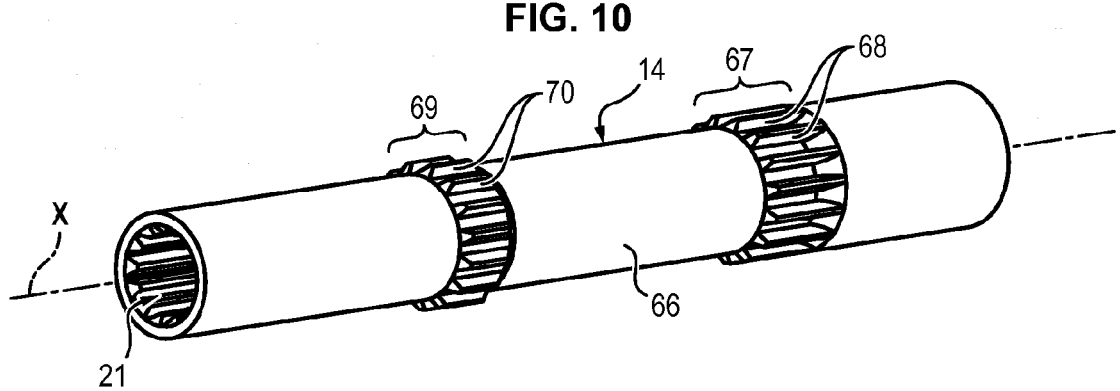
Figure 11:
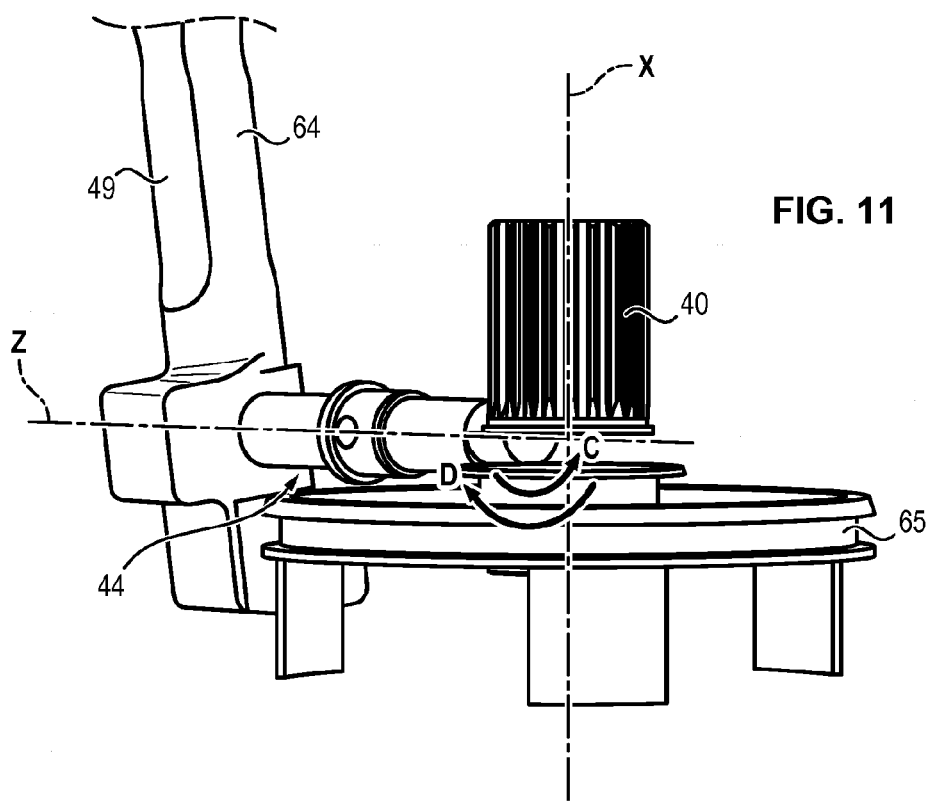
Figure 12:
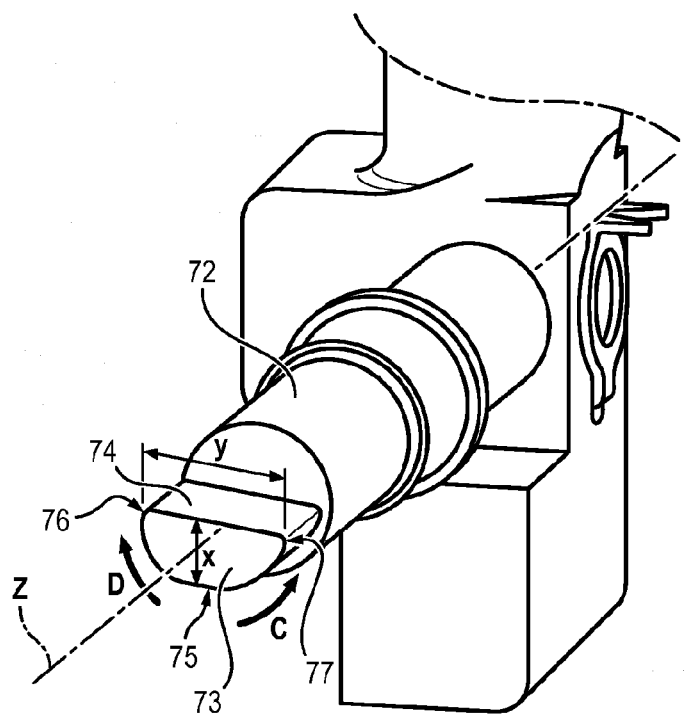

Other characteristics and advantage will emerge from the following description which is purely illustrative and non-limiting and must be considered in conjunction with the appended figures, wherein:

FIG. 1 schematically illustrates an actuator assembly for thrust reverser according to an embodiment of the invention, FIG. 2 schematically illustrates, in longitudinal section, a device for driving reverse thrust actuators according to a first embodiment of the invention, FIG. 3 schematically illustrates, in an exploded view, a control part forming part of the driving device of FIG. 2, FIG. 4 is a schematic view in cross-section of the driving device, revealing the control part, FIG. 5 schematically illustrates relative positioning of the guide ramps and flexible blades of the control part, FIG. 6 is a schematic view in cross-section of the actuator device when the control part is in a powered drive position and when the control part is in a manual drive position, FIG. 7 schematically illustrates, in cross-section, a housing arranged in a casing of the device and designed to receive a lockpin, FIG. 8 schematically illustrates, in longitudinal section, a driving device of reverse thrust actuators according to a second embodiment of the invention, FIG. 9 is a detailed view of the driving device of FIG. 8, FIG. 10 schematically illustrates, in perspective, a motor shaft of the device of FIG. 8, FIGS. 11 and 12 schematically illustrate, in perspective, an actuation part of the device of FIG. 8,

DETAILED DESCRIPTION OF AN EMBODIMENT

In FIG. 1, the actuator assembly 1 for thrust reverser comprises a thrust reverser control unit 2, a driving device 3, a plurality of flexible shafts 4 to 7 and a plurality of actuators 8 to 11.

The thrust reverser control unit 2 (or TRCU) is adapted to receive command signals from the full authority digital engine control (or FADEC) and control the driving device 3 as a function of the control signals it receives.

The driving device 3 is adapted to rotatably drive the flexible shafts 4 to 7 to cause deployment or retraction of the actuators 8 to 11.

The right drive flexible shaft 4 (or RDFS) connects the driving device 3 to the upper right actuator 8 (or URA). The left drive flexible shaft 5 (or LDFS) connects the driving device 3 to the lower left actuator 9 (or LLA). The right flexible shaft 6 (or RFS) connects the upper right actuator 8 to the lower right actuator 10 (or LRA). The left flexible shaft 7 (or LFS) connects the lower left actuator 9 to the upper left actuator 11 (or ULA).

The four flexible shafts 4 to 7 transmit rotation movement generated by the driving device 3 to the four actuators 8 to 11, mechanically synchronising displacement of the actuators.

Each actuator 8 to 11 is connected both to a casing of the jet engine (not shown) and to a movable cowl of the thrust reverser (not shown) to shift the movable cowl relative to the casing.

FIG. 2 schematically illustrates in longitudinal section a driving device 3 according to a first embodiment.

The driving device 3 shown in FIG. 2 selectively allows manual drive or powered drive of the actuators 8 to 11 of thrust reversers.

The driving device 3 comprises a casing 12, a first motor shaft 13, a second motor shaft 14, a power drive unit 15, a brake 16, a manual drive unit 17, a clutch 18 and a resolver 19.

The first motor shaft 13 and the second motor shaft 14 extend inside the casing 12.

Each of the first and of the second motor shaft 13 and 14 comprises a first end 20 connected at output of the power drive unit 15 and a second end 21 shaped for being connected to a flexible drive shaft. The first motor shaft 13 is connected to the right flexible drive shaft 4 (RDFS) while the second motor shaft 14 is connected to the left flexible drive shaft 5 (LDFS). To this effect, each of the engine shafts 13 and 14 comprises on its second end 21 a splined bore adapted to receive a complementary splined end of a flexible shaft.

The engine shafts 13 and 14 are rotatably mounted relative to the casing 12 according to a common axis of rotation X corresponding to the longitudinal axes of the engine shafts 13 and 14.

The power drive unit 15 comprises an electric motor 22. The electric motor 22 comprises a stator 23 of hollow cylindrical shape fixedly mounted on the casing 12, and a rotor 24 extending inside the stator 23 and adapted to be rotatably driven relative to the stator 23 according to the axis X when the electric motor is powered.

The engine shafts 13 and 14 are fixedly mounted on the rotor 24, such that when the electric motor is powered, the rotor 24 simultaneously rotatably drives the engine shafts 13 and 14.

The brake 16 comprises an electromagnet 25 and a plurality of brake discs. The brake discs include first brake discs 26 rotationally fixed to the casing 12, and second brake discs 27 integral in rotation with the motor shaft 14. Also, the first brake discs 26 are movable in translation according to the axis X relative to the casing 12. To this effect, the casing 12 has guide splines for guiding the first brake discs 26 in translation and prohibiting rotation of the first brake discs 26 relative to the casing 12. Similarly, the second brake discs 27 are movable in translation relative to the motor shaft 14. To this effect, the motor shaft 14 has guide splines for guiding the second brake discs 27 in translation and prohibiting rotation of the second brake discs 27 relative to the motor shaft 14.

The first brake discs 26 and the second brake discs 27 are interleaved together.

When the electromagnet 25 is not electrically powered, the brake 16 is in a clamped configuration. In this configuration, the first and second brake discs 26 and 27 are kept clamped against each other, preventing rotation of the motor shaft 14 relative to the casing 12. When the electromagnet 25 is electrically powered, the brake 16 is in a loosened configuration. In this configuration, the first and second brake discs 26 and 27 are spread apart from each other, enabling rotation of the motor shaft 14 relative to the casing 12.

The manual drive unit 17 comprises an input shaft 28, a lockpin 29 fixed to the input shaft 28, a torque limiter 30, a first gear wheel 31 and a second gear wheel 32.

The input shaft 28 comprises a socket 33 rotatably mounted on the casing 12 about an axis of rotation Y, parallel to the axis of rotation X of the motor shaft 14, and a rod 34 slidingly mounted inside the socket 33 according to a direction parallel to the axis Y. The rod 34 is kept integral in rotation with the socket 33 by the lockpin 29.

The rod 34 has a first end 35 shaped for being connected to a screwing and unscrewing tool (for example an electric screwdriver or a key), and a second end 36 to which the lockpin 29 is fixed.

The socket 33 is rotatably mounted relative to the casing 12.

The lockpin 29 extends in a radial direction relative to the axis of rotation Y of the socket 33.

The lockpin 29 is adapted to be received in a housing arranged in the casing 12. Also, the rod 34 is movable in translation relative to the socket 33 between a locked position wherein the lockpin 29 is received in the housing so as to prevent rotation of the input shaft 28 and an unlocked position wherein the lockpin 29 is out of the housing so as to allow rotation of the input shaft 28.

More precisely, as illustrated in FIG. 3, the housing 37 arranged in the casing 12 comprises several cavities 38 radially disposed in a star pattern about the axis Y. Each cavity 38 is adapted to receive the lockpin 29 as a function of the angular position of the lockpin 29 relative to the axis Y.

The manual drive unit 17 further comprises a return spring 39 arranged to stress the rod 34 towards the locked position.

The first gear wheel 31 is fixedly mounted on the socket 33 and is capable of being rotatably driven relative to the casing 12 about the axis Y.

The second gear wheel 32 extends about the motor shaft 14 and is rotatably movable about the axis X. The second gear wheel 32 meshes with the first gear wheel 31 such that rotation of the first gear wheel 31 about the axis Y causes rotation of the second gear wheel 32 about the axis X. The first gear wheel 31 and the second gear wheel 32 form a reducer.

The clutch 18 comprises a clutch part 40 movable in translation relative to the motor shaft 14 parallel to the axis X, but integral in rotation with the motor shaft 14.

The clutch part 40 is movable in translation relative to the motor shaft 14 between an engaged position wherein the clutch part 40 is engaged with the second gear wheel 32 to rotationally connect the second gear wheel 32 and the motor shaft 14, and a disengaged position wherein the clutch part 40 is not engaged with the second gear wheel 32 such that the motor shaft 14 is free in rotation relative to the second gear wheel 32.

The clutch part 40 comprises a set of teeth 41 adapted to be engaged with teeth 42 of the second gear wheel 32 in the engaged position.

The clutch 18 also comprises a return spring 43 arranged to stress the clutch part 40 towards the disengaged position.

The driving device 3 further comprises a control part 44 actuatable by an operator to move from a powered drive mode to a manual drive mode and vice versa. The control part 44 extends between the brake 16 and the clutch 18. The control part 44 is rotatably movable about the axis X relative to the casing 12. More precisely, the control part 44 is movable between a first control position called "powered drive position" and a second control position called "manual drive position".

The clutch part 40 comprises a plurality of pins 45 arranged to be supported against ramps 46 of the control part 44. The ramps 46 and the pins 45 are configured such that rotation of the control part 44 about the axis X causes translation of the clutch part 40 parallel to the axis X.

The return spring 43 keeps the pins 45 supported against the ramps of the control part 44.

One of the first brake discs 26 also comprises pins 47 arranged to engage in elastic blades 48 of the control part. The elastic blades 48 are configured such that the effect of rotation of the control part 44 about the axis X of the powered drive position to the manual drive position is to stress the first brake disc 26 by moving it away from the other discs so as to loosen the brake 16.

The driving device 3 also comprises a control lever 49 fixed to the control part 44, the lever being adapted to be gripped by an operator to allow the operator to manoeuvre the control part 44.

The control part 44 and the control lever 49 are illustrated in more detail in FIGS. 3 and 4. The control part 44 comprises a cylindrical body 50, a ring 51, and a plurality of elastic blades 48. The ring 51 is fixed on a first side 52 of the body 50 and the flexible blades 48 are fixed on a second side 53 of the body 50, opposite the first side of the body 50. The first side 52 of the body 50 is directed towards the clutch 18 while the second side 53 of the body 50 is directed towards the brake 16.

The ring 51 has a surface directed towards the clutch, forming a plurality of guide ramps 46.

More precisely, the surface of the ring 51 forms three guide ramps 46, disposed about the axis X with an angular spread of 120 degrees between two successive ramps, and the clutch part 40 comprises three pins 45, each pin 45 being held supported against a ramp 46 associated under the effect of the return spring 43.

There are three flexible blades 48 which are disposed about the axis X with an angular spread of 120 degrees between two successive flexible blades 48.

Each flexible blade 48 has an arced shape and comprises two branches 54 and 55 forming between them a guide hole 56 wherein the pin 47 slides when the control part 44 is rotatably driven relative to the casing 12. One of the branches 54 is fixed to the body 50 of the control part 44 while the other branch 55 is not fixed to the body 50 so as to allow some elastic deformation of the flexible blade 48 under the effect of traction exerted by the pin 47.

The elastic deformation of the flexible blade 48 absorbs any existing clearance between the different pieces of the device, given the short stroke necessary for gripping and loosening of the brake.

The effect of rotation of the control part 44 from the powered drive position towards the manual drive position is both to move the clutch part 40 towards the engaged position so as to engage the manual drive unit 17 with the motor shaft 14, and also to stress the brake 16 towards the loosened configuration to allow rotatably driving of the motor shaft 14 by the manual drive unit 17.

As schematically illustrated in FIG. 6, the guide ramps 46 and the flexible blades 48 are arranged so that during rotation of the control part 44 from the powered drive position to the manual drive position the clutch part 40 is first moved to the engaged position, then the brake 16 is loosened. In this way, the brake 16 is loosened only once the manual drive unit 17 is engaged with the motor shaft 14, preventing any accidental deployment of the actuators of the thrust reverser.

FIG. 7 schematically illustrates the control part 44 and the control lever 49 respectively when the control part 44 is in the powered drive position and when the control part 44 is in the manual drive position.

The control part 44 comprises a bore 57 formed in the body 50 of the control part 44, and a locking pin 58 slidably mounted relative to the body 50, inside the bore 57. The locking pin 58 is movable in the bore 57 between a retracted position wherein the pin 58 entirely extends inside the bore 57 and a locking position wherein the pin 58 protrudes outside the bore 57.

The casing 12 comprises a plurality of housings 59 adapted to receive the pin 58 when the pin 58 protrudes from the bore 57 so as to lock the control part on the casing 12. The housings 59 are positioned such that the pin 58 faces a housing 59 when the control part 44 is in the powered drive position and when the control part 44 is in the manual drive position.

The control part 44 also comprises a return spring 60 positioned inside the bore 57 and arranged to stress the pin 58 towards the retracted position.

The control lever 49 comprises a cylinder 61 fixedly mounted on the body 50 of the control part 44, a piston 62 slidably mounted inside the cylinder 61 between an engaged position wherein the piston 62 is capable of urging the pin 58 towards the locked position and a disengaged position wherein the piston 62 does not stress the pin 58, and a spring 63 arranged to urge the piston 62 towards the engaged position. The spring 63 is dimensioned such that it exerts on the piston 62 force greater than the force exerted by the spring 60 on the pin 58.

The control lever 49 comprises a gripping part 64 slidably mounted relative to the cylinder 61, the gripping part 64 being adapted to be gripped by an operator to allow the operator to unlock the pin 58 and turn the control part 44 relative to the casing 12.

The driving device 3 which has just been described in reference to FIGS. 2 to 7 operates as follows.

The control part 44 is initially in the powered drive position. In this position, the motor 22 is not powered and the brake 16 is clamped. Also, the manual drive unit 17 is disengaged. As the brake 16 is clamped, the motor shaft 14 cannot be rotatably driven.

Also, the pin 58 of the lever 49 is in locked position, such that the control part 44 is immobilised relative to the casing 12.

When wanting to carry out maintenance operations, an operator moves the actuation part 44 from the powered drive position to the manual drive position.

To this effect, the operator grasps the gripping part 64 of the lever 49 and pulls on the gripping part 64 so as to stress the piston 62 against the spring 63, the effect of which is to have the piston 62 slide inside the cylinder 61 from the engaged position to the disengaged position.

In the disengaged position, the piston 62 no longer stresses the locking pin 58. In the absence of stress on the part of the piston 62, the locking pin 58 returns to the housing 57 under the action of the spring 60. The locking pin 58 moves from the locking position to the retracted position.

The operator then moves the lever 49 to turn the actuation part 44 about the axis X. The operator moves the actuation part 44 in a first direction (arrow A) from the powered drive position to the manual drive position.

The effect of displacement of the actuation part 44 from the powered drive position to the manual drive position is to successively shift the clutch part 40 towards the engaged position then move the brake 16 towards the loosened configuration.

When the clutch part 40 is in the engaged position, the clutch part 40 is engaged with the second gear wheel 32 by means of teeth 41 and 42. In this way, the motor shaft 14 is integral in rotation with the second gear wheel 32. In other words, the manual drive unit 17 is engaged with the motor shaft 14.

The operator then affixes a screwing and unscrewing tool to the first end 35 of the rod 34 of the input shaft 28. Using the screwing and unscrewing tool the operator first exerts pressure on the rod 34 parallel to the direction of the axis Y towards the unlocked position so as to disengage the lockpin 29 from the housing 37. Then, while keeping the pressure exerted on the rod 34 the operator rotatably drives the rod 34 by means of the screwing and unscrewing tool, the effect of which is to rotatably drive the input shaft 28 of the manual drive unit 17.

The input shaft 28 rotatably drives the first gear wheel 31 about the axis Y, which in turn rotatably drives the second gear wheel 32 about the axis X.

As the second gear wheel 32 is connected to the motor shaft 14, the motor shaft 14 is rotatably driven about the axis X. Rotation of the motor shaft 14 is transmitted to the actuators 8 to 11 of the thrust reverser by means of the flexible shafts 4 to 7 of the actuator assembly 1.

The operator can deploy and retract the actuators 8 to 11 by means of the manual drive unit 17, whereas the motor 22 of the power drive unit 15 and the brake 16 are not supplied.

Once maintenance operations are finished, the operator uncouples the screwing and unscrewing tool from the first end 35 of the rod 34 of the input shaft 28.

Under the effect of the return spring 39, the rod 34 slides in the socket 33 towards the locked position and the lockpin 29 is returned to the housing 37.

Next, the operator moves the lever 49 to have the actuation part 40 turn about the axis X. The operator moves the actuation part 40 in a second direction (arrow B), opposite the first direction, from the manual drive position to the powered drive position.

The effect of displacement of the actuation part 40 from the manual drive position to the powered drive position is to successively move the brake 16 towards the clamped configuration then move the clutch part 40 towards the disengaged position.

In this way, the manual drive unit 17 is disengaged only once the brake 16 is clamped.

Once the actuation part 40 is in the powered drive position, the locking pin 58 faces the housing 59. Under the effect of the spring 63, the locking pin 58 is returned to the locking position in the housing 59 of the casing 12.

The control part 40 is locked again on the casing 12.

FIGS. 8 and 9 schematically illustrate, in longitudinal section, a reverse thrust driving device 3 for actuators according to a second embodiment.

This second embodiment is identical to the first embodiment, with the exception that the device comprises a single motor shaft 14 presenting a first end 21' adapted to be connected to the right drive flexible shaft 4 (RDFS) and a second end 21 adapted to be connected to the left drive flexible shaft 5 (LDFS). To this effect, the motor shaft 14 comprises at each of its ends 21, 21' a splined bore adapted to receive a complementary splined end of a flexible shaft. The motor shaft 14 is rotationally fixed to the rotor 24 of the electric motor 22.

Also, in this second embodiment, the clutch part 40 is rotationally fixed to the gear wheel 32 and is movable in translation relative to the gear wheel 32 and relative to the motor shaft 14. To this effect, the gear wheel 32 has inner splines 78 and the clutch part 40 has outer splines 79 interleaved between the inner splines 78 of the wheel 32 to guide the clutch part 40 in translation relative to the wheel 32.

The clutch part 40 is movable in translation relative to the motor shaft 14 between an engaged position wherein the clutch part 40 is engaged with the motor shaft 14 and a disengaged position wherein the clutch part 40 is not engaged with the motor shaft 14.

In other words, in this second embodiment, the motor shaft 14 is free in rotation relative to the clutch part 40, when the clutch part 40 is in the disengaged position.

The advantage of this second embodiment is that when the motor shaft 14 is rotatably driven by means of the power drive unit 15, the clutch part 40 is not rotatably driven. The effect of this is to reduce the inertia of the device 3.

Also, in this second embodiment, the control part 44 is rotatably movable about a radial axis Z, perpendicular to the axis of rotation X of the motor shaft 14. More precisely, the control part 44 is adapted to be moved from the powered drive position to the manual drive position by rotation of a quarter turn about the axis Z.

The driving device comprises a plate 65 movable in translation parallel to the axis X and adapted to stress one of the brake discs 26 to move the brake 16 towards the loosened position.

The control part 44 is disposed between the clutch part 40 and the movable plate 65.

FIG. 10 schematically illustrates the motor shaft 14 of the driving device 3.

The motor shaft 14 comprises a body 66 of general cylindrical shape of axis X. The motor shaft 14 has on its outer surface a first area 67 presenting first longitudinal splines 68 adapted to guide the second brake discs 27 integral in rotation with the motor shaft 14. Also, the motor shaft 14 has on its outer surface a second area 69 presenting second longitudinal splines 70 adapted to engage with complementary inner splines 71 of the clutch part 40 when the clutch part 40 is in the engaged position.

The control part 44 is shown in more detail in FIGS. 11 and 12.

The control part 44 comprises a body 72 substantially cylindrical extending according to the axis Z and a cam 73 extending from one end of the body 72. The cam 73 has a half-moon cross-section. More precisely, the cam 73 comprises a planar surface 74 and a domed surface 75, opposite the planar surface 74. The planar surface 74 and the domed surface 75 combine at the level of two longitudinal ridges 76, 77.

So, the cam 73 has a first cross-section dimension x and a second cross-section dimension y, the first dimension x being less than the second dimension y. Also, the domed surface 75 has a radius measured from the axis Z which varies along the domed surface.

When the control part 44 is in the powered drive position the cam 73 is positioned between the clutch part 40 and the movable plate 65, the planar surface 74 facing the clutch part 40 and the domed surface facing the movable plate 65 (FIG. 11). More precisely, the planar surface 74 is in contact with the clutch part 40 and the domed surface is in contact with the movable plate 65.

In this position, the clutch part 40 and the movable plate 65 are spaced apart from each other by a distance equal to the first dimension x of the cam 73.

When the control part 44 is rotatably driven by a quarter turn about the axis Z (arrow C), the domed surface 75 of the cam 73 slides on the movable plate 65. The contact area between the domed surface 75 and the movable plate 65 moves along the domed surface 75 such that the radius of the domed surface, taken at the point of contact, increases.

The effect is that the cam 73 pushes the movable plate 65 according to the axis X towards the brake 16, which causes loosening of the brake 16.

Also, the control part 44 pushes the clutch part 40 according to the axis X by means of one of the longitudinal ridges 77 of the cam 73.

When the control part 44 has pivoted by a quarter turn about the axis Z, the clutch part 40 and the movable plate 65 are spaced apart from each other by a distance equal to the second dimension y of the cam 73. In other words, the effect of rotation by a quarter turn of the control part 44 is to move the clutch part 40 and the movable plate 65 apart from each other.

The driving device 3 which has just been described in reference to FIGS. 8 to 12 operates as follows.

The control part 44 is initially in the powered drive position. In this position, the motor 22 is not powered and the brake 16 is clamped. Also, the manual drive unit 17 is disengaged. As the brake 16 is clamped, the motor shaft 14 cannot be rotatably driven.

To perform maintenance operations, an operator moves the actuation part 44 from the powered drive position to the manual drive position.

To this effect, the operator grips the gripping part 64 of the lever 49 and pivots the lever 49 by a quarter turn about the axis Z, the effect of which is to turn the actuation part 44 about the axis Z.

The operator moves the actuation part 44 in a first direction (arrow C), from the powered drive position to the manual drive position.

The effect of displacement of the actuation part 44 from the powered drive position to the manual drive position is to successively move the clutch part 40 towards the engaged position then move the brake 16 towards the loosened configuration.

When the clutch part 40 is in the engaged position, the clutch part 40 is engaged with the motor shaft 14 by means of the splines 70 and 71. In this way, the motor shaft 14 is integral in rotation with the second gear wheel 32. In other words, the manual drive unit 17 is engaged with the motor shaft 14.

The operator then affixes a screwing and unscrewing tool to the first end 35 of the rod 34 of the input shaft 28. Using the screwing and unscrewing tool the operator first exerts pressure on the rod 34 parallel to the direction of the axis Y towards the unlocked position so as to disengage the lockpin 29 from the housing 37. Next, while keeping pressure exerted on the rod 34 the operator rotatably drives the rod 34 by means of the screwing and unscrewing tool, the effect of which is to rotatably drive the input shaft 28 of the manual drive unit 17.

The input shaft 28 rotatably drives the first gear wheel 31 about the axis Y, which in turn rotatably drives the second gear wheel 32 about the axis X.

As the second gear wheel 32 is connected to the motor shaft 14, the motor shaft 14 is rotatably driven about the axis X. The rotation of the motor shaft 14 is transmitted to the actuators 8 to 11 of the thrust reverser by means of flexible shafts 4 to 7 of the actuator assembly 1.

The operator can deploy and retract the actuators 8 to 11 by means of the manual drive unit 17, whereas the motor 22 of the power drive unit 15 and the brake 16 are not supplied.

Once maintenance operations are finished, the operator uncouples the screwing and unscrewing tool from the first end 35 of the rod 34 of the input shaft 28.

Under the effect of the return spring 39 the rod 34 slides in the socket 33 towards the locked position and the lockpin 29 is returned to the housing 37.

Next, the operator moves the lever 49 to have the actuation part 40 turn by a quarter turn about the axis Z. The operator moves the actuation part 40 in a second direction (arrow D), opposite the first direction, from the manual drive position to the powered drive position.

The effect of displacement of the actuation part 40 from the manual drive position to the powered drive position is to successively move the brake 16 towards the clamped configuration then move the clutch part 40 towards the disengaged position.

In this way, the manual drive unit 17 is disengaged only once the brake 16 is clamped.

The invention claimed is:

1. A device for driving actuators for a thrust reverser comprising:
   a power drive unit comprising a motor,
   a motor shaft adapted to be connected to a flexible drive shaft of the actuators, the motor shaft being suitable to be rotatably driven by the motor about an axis of rotation,
   a manual drive unit comprising a drive wheel rotatably mounted about the axis of rotation, and
   a clutch comprising a clutch part rotationally fixed to the drive wheel and movable in translation relative to the drive wheel between an engaged position wherein the clutch part is engaged with the motor shaft so as to rotatably connect the motor shaft and the drive wheel and a disengaged position wherein the clutch part is not engaged with the motor shaft so as to allow independent rotation of the motor shaft and of the drive wheel.

2. The device according to claim 1, wherein the clutch part is movable in translation along an axis parallel to the axis of rotation.

3. The device according to claim 1, wherein the drive wheel has inner splines and the clutch part has outer splines interleaved between the inner splines of the drive wheel to guide the clutch part in translation relative to the drive wheel.

4. The device according to claim 1, wherein the clutch part has inner splines suitable for engaging with outer splines of the motor shaft when the clutch part is in the engaged position.

5. The device according to claim 1, wherein the manual drive unit comprises a rotatably movable input shaft, the input shaft being suitable for being temporarily connected to a screwing and unscrewing tool to rotatably drive the drive wheel.

6. The device according to claim 5, wherein the manual drive unit comprises an input wheel rotationally fixed to the input shaft, the drive wheel meshing with the input wheel to convert rotation movement of the input shaft into rotation movement of the drive wheel.

7. The device according to claim 5, wherein the input shaft of the manual drive unit has an end shaped for being temporarily connected to the screwing and unscrewing tool to rotatably drive the input shaft.

8. The device according to claim 5, comprising a casing and wherein the manual drive unit comprises a lockpin fixed to the input shaft, the casing has a reception housing for receiving the lockpin, and the input shaft is movable in translation relative to the casing between a locked position wherein the lockpin is received in the housing so as to prevent rotation of the input shaft and an unlocked position wherein the lockpin is out of the housing so as to allow rotation of the input shaft.

9. The device according to claim 8, wherein the manual drive unit comprises a spring arranged to urge the input shaft towards the locked position.

10. The device according to claim 1, comprising a casing and a control part actuatable by an operator, the control part being movable relative to the casing between a powered drive position and a manual drive position, displacement of the control part from the powered drive position towards the manual drive position causing the clutch part to move towards the engaged position so as to engage the manual drive unit with the motor shaft.

11. The device according to claim 10, further comprising a brake movable between a clamped configuration wherein the brake prevents rotation of the motor shaft and a loosened configuration wherein the brake allows rotation of the motor shaft, and wherein displacement of the control part from the powered drive position towards the manual drive position also causes urging the brake towards the loosened configuration to allow a rotary drive of the motor shaft by the manual drive unit.

12. An actuator assembly for a thrust reverser, comprising:
   a plurality of actuators adapted to actuate a movable cowl of the thrust reverser,
   a device for driving actuators according to claim 1, and
   a plurality of flexible shafts connecting the motor shaft of the device for driving actuators to the plurality of actuators to transmit rotation from the motor shaft to each actuator of the plurality of actuators so as to cause deployment or retraction of each actuators of the plurality of actuators.

\* \* \* \* \*